United States Patent Office 3,218,299
Patented Nov. 16, 1965

3,218,299
PROCESS FOR PREPARING TERNARY COPOLYMERS FROM STYRENE, ALLYL-FUMARATE, AND ACRYLIC MONOMERS; AND THE UTILIZATION THEREOF FOR MAKING PLASTICS REINFORCED BY FIBERS
Piero Zanaboni and Carlo Barbensi, Milan, Italy, assignors to Montecatini-Società Generale per l'Industria Mineraria e Chimica, Milan, Italy, an Italian corporation
No Drawing. Filed Apr. 26, 1961, Ser. No. 106,143
Claims priority, application Italy, Apr. 29, 1960, 7,601/60
4 Claims. (Cl. 260—78.5)

The present invention relates to a new type of unsaturated polymeric material which can be used as a solution in or mixture with unsaturated monomeric materials. Upon further polymerizing them under the action of heat and/or catalysts they are transformed into insoluble and infusible products.

The present invention also includes a method for preparing said products.

The said unsaturated polymeric products, when dissolved in the monomers, are especially suitable for preparing reinforced plastics, in which a glass reinforcement, such as glass mat, glass fabric, or glass fibers are cut into suitable sizes and shapes and impregnated with a liquid resin.

The unsaturated polymeric material is obtained by copolymerizing a mixture comprising styrene, diallyl fumarate and methyl methacrylate.

It is known that styrene easily copolymerizes with diallyl fumarates, such as diallyl fumarate and dimethallyl fumarate. However, the copolymerization reaction is difficult to control, and may result in a premature insolubilization and gelation of the reaction mixture.

It is also known that when the copolymerization reaction is carried out in a solvent high conversions may be obtained. However, in such case the polymerization rate is reduced, so that the process is inconvenient.

It is further known that the copolymerization reaction may be more readily controlled by using suitable polymerization regulating agents, which generally, at least in a small percentage, copolymerize with the used monomers, as when monomeric allyl alcohol or carbon tetrachloride are used.

We have now found that by reacting styrene with an allyl fumarate in the presence of an acrylic monomer, for instance methyl methacrylate, and heating the mixtures at temperatures between 40° and 100° C., preferably at 70°–80° C., in the presence of a peroxidic catalyst, a fusible and soluble product consisting of a copolymer of the three monomeric components (i.e. including the methylmethacrylate) is obtained, with high conversions. In this copolymer, the double bonds of the diallyl fumarate are still present. Therefore, the product can further polymerize to give an insoluble and infusible compound.

The course of the copolymerization reaction may be watched by controlling the increase of the viscosity in the reaction mixture. The reaction is stopped by cooling when the desired degree of polymerization is reached.

The copolymer thus obtained may be separated from the reaction mixture, for instance by adding a non-solvent for the copolymer itself, such as methyl alcohol or petroleum ether. For the purposes of the present invention, however, it is not necessary to separate the produced copolymer.

In fact, the solution obtained which, according to the conversion degree reached, shows a viscosity varying from 500 to 20,000 centipoises, may be used as such, after adding a further amount of peroxidic catalyst. Or it may be diluted with an additional amount of methyl methacrylate monomer. It is then employed for the impregnation of fibrous supports, such as paper, cotton fabrics, or other fabrics made from vegetable or synthetic textile fibers, and of supports based on glass fibers, in the form of rovings, mats or fabrics. Our copolymer is more suitable for impregnating the above mentioned fibrous supports when it is in the form of a more or less viscous liquid.

The molar ratio between styrene and the diallyl fumarate may be varied within very wide ranges, such as from 10 moles of styrene per 1 mole diallyl fumarate to 0.1 mole styrene for 1 mole diallyl fumarate. The amount of methyl methacrylate to be used may vary, the lowest recommended amount being at least equal to 10% by weight based upon the total weight of the other reagents. Generally, we prefer to employ a high excess of methylmethacrylate, since the higher the quantity of methylmethacrylate the more the copolymerization reaction may be controlled. Furthermore, in this case the polymer obtained is rich in methylmethacrylate, and makes it possible to obtain reinforced plastics showing particularly valuable properties when it associates with glass fibers. The association of glass with methylmethacrylate polymer results in very good mechanical strength, weatherproofness, and fastness to yellowing usually caused by sun radiation. These desirable characteristics are shown by the product of the present invention when said product is suitably enriched in the methylmethacrylate component.

An advantage of the present invention resides in that the copolymer based on styrene-diallyl-fumarate-methylmethacrylate, employed in the form of a solution in the same monomers, is able to further polymerize after the addition of a suitable catalyst, upon heating, in a short time, and without bubbling under curing.

The curing of the product is therefore readily carried out according to prior techniques used in the moulding of the reinforced plastics, particularly by using temperatures varying from 60° to 120° C. and pressures varying from the pressure of a simple contact up to about 20–25 kg./cm.$^2$. When moulding temperatures of 80–110° C. and pressure of about 7 kg./cm.$^2$ are used, less than 20 minutes are generally sufficient to obtain good curing of the product.

For preparing the copolymers according to the present invention, suitable allyl fumarates are the diallyl fumarate and the dimethallyl fumarate. The styrene may be partially or entirely replaced by styrene p-derivatives, such as the p-chloro styrene and the p-methyl-styrene. The methylmethacrylate may be entirely or partially replaced by other methacrylic or acrylic esters.

Acetyl peroxide, benzoyl peroxide, lauroyl peroxide and ter. butyl-hydroperoxide are suitable catalysts for the copolymerization. The copolymerization reaction may be carried out in the presence of inhibitors, such as lauryl mercaptan, octyl mercaptan, and ethyl ester of the thioglycolic acid.

In order to have good stability when stored, it is preferable to add a polymerization inhibitor to the product obtained from the copolymerization reaction. Hydroquinone, p-tertiary butyl catecol, and ascorbic acid are suitable inhibitors.

The product consisting of the copolymer dissolved in the unreacted monomers may be further diluted with unsaturated monomers, such as methylmethacrylate, styrene, vinylacetate, diallylfumarate or their mixtures. However, for the purposes of the instant invention it is preferable to dilute only with monomeric methylmethacrylate.

When necessary, the solution of the copolymer in the monomers may be filled with mineral fillers, such as calcium carbonate, mica, fossil flour, and talc, and may be colored with pigments or other colorants.

The catalysts especially suitable for the curing of the product are the peroxides, viz. benzoyl and lauroyl peroxides.

A light stabilizer, such as methylsalicylate or 2-oxy-4-methoxybenzophenone, may be introduced into the solution of the polymer in the unreacted monomers.

The preparation and the use of the new products is illustrated by the following embodiments, which are not intended to be exemplary and not limitative.

EXAMPLE 1

70 grams diallylfumarate, 180 grams styrene, 810 grams methylmethacrylate, 8.9 grams ethyl-hexyl-mercaptan

9.3 grams lauroyl peroxide are introduced into a reaction vessel provided with a stirrer, reflux cooler, thermometer, and a pipe for feeding inert gas. The stirrer is started and a stream of carbon dioxide is intorduced, the vessel being heated by a water bath kept at a constant temperature of $80 \pm 1°$ C. After a reaction time of about 100 minutes, an amount of hydroquinone equal to 0.1% by weight, calculated with respect to the total weight of the raw material used, is added to the reaction mixture, which has become more and more viscous in time. The reaction vessel is cooled.

The viscosity of the syrup thus obtained is about 10–15,000 centipoises at 20° C.

100 grams of the product thus obtained are mixed with petroleum ether. The copolymer which precipitates is purified by dissolving it in acetone and by precipitating it again with petroleum ether. Upon drying under vacuum to a constant weight, 52.3 g. of a solid product are obtained.

The fraction remaining dissolved in petroleum ether was analyzed with a spectrophotometer. It consists of:

4.1 parts monomeric styrene
7.6 parts monomeric diallylfumarate
36 parts monomeric methylmethacrylate Spectrophotometric analysis of the solid product separated as described above showed that homopolymers of the single components are not present, and they cannot be separated even by solvent fractionation. Therefore, the analysis shows that the solid product thus obtained is a copolymer formed of about 21.6% styrene, 13.4% diallyl fumarate, and 65% methylmethacrylate. Said results correspond to a conversion, to the copolymer, of 73.5% of the monomeric styrene and 48% of the monomeric diallyl fumarate.

EXAMPLE 2

9 moles methylmethacrylate, 1 mole diallylfumarate, and 2 moles styrene are reacted in the presence of 0.6% by weight of benzoylperoxide, calculated with respect to the total weight of the reagents, heating the reaction vessel at a temperature of $70 \pm 1°$ C. Samples of the reaction mixture are taken at regular intervals. The conversion yields are determined by precipitating the copolymer with methyl alcohol, and by drying the solid copolymer thus precipitated, under vacuum.

The course of the reaction is illustrated by the following table:

Table 1

| Reaction time (minutes) | Copolymer, percent by weight on the total weight | Viscosity, cp. |
|---|---|---|
| 30 | 4.5 | 150 |
| 60 | 14 | 180 |
| 90 | 23 | 200 |
| 110 | 30.5 | 230 |
| 130 | 38.2 | 300 |
| 145 | 41.6 | 380 |
| 160 | 48.8 | 450 |
| 170 | 49.2 | 800 |
| 180 | 53.4 | 1,500 |
| 185 | 56 | 3,300 |
| 195 | 61 | 8,500 |
| 205 | 65 | 15,000 |
| 215 | 68 | 30,000 |

EXAMPLE 3

The preparation of Example 2 is repeated. However, after 185 minutes of reaction, 0.1% by weight hydroquinone, based on the total weight of the reagents, is introduced into the reaction vessel, which is then cooled at room temperature. 1.2 grams of 2-oxy-4-methoxybenzophenone and 5 grams benzoylperoxide are added to 500 grams of the solution of the copolymer in the unreacted monomers obtained as described immediately above. The product is then poured between two glass plates spaced apart about 3 mm. thick, by means of a strip of polyvinyl chloride. This product kept in a stove at a temperature of 60–70° C. for about 2 hours, results in a completely polymerized insoluble and infusible product.

The polymer plate removed from the glass mold shows the following characteristics:

Rockwell hardness, M scale _____ 85–90
Resistance to bending stress, kg./cm.$^2$ _____ 850–900
Elasticity modulus under bending stress, kg./cm.$^2$ _____ 35,000
Distortion temperature under heat, ° C. _____ 76

A specimen undergoes the action of a sunlight lamp for 100 hours. The percentage of the light transmitted by the plate to a distance equal to 450 m. before and after the exposure is respectively 87.8 and 87.7%, thus showing a percentage decrease of transparency lower than 0.1%.

EXAMPLE 4

700 parts of the syrup obtained according to Example 1, are mixed with 300 parts of monomeric methylmethacrylate. 10 grams benzoyl peroxide are added to the mixture. 2 layers of about 30 x 30 square centimeters of a glass mat (450 g./m.$^2$) of the type containing a highly soluble binder, are impregnated, between cellophane sheets, with about 200 grams of the above mentioned catalyzed resin.

The impregnated material is placed between two metal plates, spaced apart about 3 mm., by means of a hemp cord. The whole assembly is moulded between the plates of a press heated to 80° C. The pressure is gradually increased, to about 7 kg./cm.$^2$. After 15 minutes, the pressure is stopped and the laminate is withdrawn. The product, which is thermosetting, is sufficiently rigid at the moulding temperature.

EXAMPLE 5

800 grams of the syrup, methylmethacrylate-catalyst mixture, prepared according to Example 4, are used for impregnating a glass mat layer of about 80 x 50 cm.$^2$ of the type containing a highly soluble binder (450 g./m.$^2$). The impregnation is carried out between two cellophane sheets, taking care to remove the air bubbles by rolling. The material is laid between two corrugated plates, and placed under a load exerting a pressure of about 0.02 kg./cm.$^2$. The assembly is kept in a stove at a temperature of 70° C., for about 2 hours. After this time, the laminated material is withdrawn, since the impregnating resin is then already sufficiently polymerized.

We claim:
1. A process comprising preparing a three-component, unsaturated, copolymer, comprising reacting a first monomer component taken from the group consisting of styrene, p-chloro styrene and p-methyl styrene, and mixtures thereof; with a second monomer component taken from the group consiting of diallyl fumarate and dimethallyl fumarate, and mixtures thereof; and a third monomer component taken from the group consisting of lower alkyl esters of methacrylic acid and acrylic acid and mixtures thereof, the third component being present in an amount by weight at least twice that of the first and second components combined; at between about 40° to 100° C., in the presence of a peroxide polymerization catalyst; and halting the reaction before gelation of the mixture, thus obtaining said copolymer in admixture with unreacted monomers.

2. The process defined in claim 1, the process being regulated by carrying out the reaction in the presence of polymerization inhibitors taken from the group consisting of lauryl mercaptan, octyl mercaptan, and ethyl ester of thioglycolic acid.

3. A process comprising making a styrene, diallyl fumarate, methyl methacrylate ternary, unsaturated, copolymer by heating the three stated components at 40° to 100° C. in the presence of a peroxide polymerization catalyst, the methyl methacrylate being present in an amount by weight at least twice that of the styrene and fumarate combined, and halting the reaction before gelation of the mixture, by cooling.

4. A process comprising making a styrene, dimethallyl fumarate, methyl methacrylate ternary, unsaturated, copolymer by heating the three stated components at 40° to 100° C. in the presence of a peroxide polymerization catalyst, the methyl methacrylate being present in an amount by weight at least twice that of the styrene and fumarate combined, and halting the reaction before gelation of the mixture, by cooling.

References Cited by the Examiner
UNITED STATES PATENTS

| | | | |
|---|---|---|---|
| 2,370,578 | 2/1945 | Pollack et al. | 260—78.4 |
| 2,403,213 | 7/1946 | D'Alelio | 260—45.5 |
| 2,521,078 | 9/1950 | Meyer | 117—161 |
| 2,596,162 | 5/1952 | Muskat | 154 |
| 2,617,787 | 11/1952 | Tawney | 260—45.5 |
| 2,647,851 | 8/1953 | Schwartz | 117—126 |

RICHARD D. NEVIUS, *Primary Examiner.*

W. H. SHORT, *Examiner.*